(12) United States Patent
Fischer (10) Patent No.: US 10,118,602 B2
(45) Date of Patent: Nov. 6, 2018

(54) ADAPTIVE AUTOMATIC START-STOP SYSTEM FOR A MOTOR VEHICLE WITH AUTOMATIC GEARBOX, TAKING OBSTRUCTIONS INTO ACCOUNT

(71) Applicant: Bayerische Motoren Werke Aktiengesellschaft, Munich (DE)

(72) Inventor: Gerhard Fischer, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 78 days.

(21) Appl. No.: 15/097,993

(22) Filed: Apr. 13, 2016

(65) Prior Publication Data

US 2016/0304095 A1    Oct. 20, 2016

(30) Foreign Application Priority Data

Apr. 14, 2015   (DE) .................. 10 2015 206 658

(51) Int. Cl.
*B60W 10/06* (2006.01)
*B60W 10/188* (2012.01)
(Continued)

(52) U.S. Cl.
CPC .......... *B60W 10/188* (2013.01); *B60K 28/10* (2013.01); *B60W 10/06* (2013.01); *B60W 10/11* (2013.01);
(Continued)

(58) Field of Classification Search
CPC . Y10T 477/681; Y10T 477/65; Y10T 477/87; Y10T 477/844; Y10T 477/8416;
(Continued)

(56) References Cited

U.S. PATENT DOCUMENTS 8,781,714 B2 *   7/2014   Kim ................. B60K 28/10
                                                    123/179.3
9,790,910 B2 *   10/2017  Quinteros ........ F02N 11/084
(Continued)

FOREIGN PATENT DOCUMENTS

DE    199 24 142 A1   11/2000
DE    100 23 331 A1    6/2001
(Continued)

OTHER PUBLICATIONS

German Search Report issued in counterpart German Application No. 10 2015 206 658.4 dated Feb. 10, 2016 with partial English translation (15 pages).

*Primary Examiner* — Roger L Pang
(74) *Attorney, Agent, or Firm* — Crowell & Moring LLP (57) ABSTRACT

An automatic start-stop system for vehicles with an automatic gearbox or and automated gearbox in which the motor vehicle can creep in a released state of a brake pedal is provided. The automatic start-stop system is designed to detect an obstruction in the present direction of travel of the vehicle, to trigger an automatic deactivation process of a drive machine of the vehicle if the vehicle speed is lower than a predefined speed threshold close to standstill and the brake pedal is actuated, and to trigger an automatic activation process of the automatically deactivated drive machine if a released brake pedal is detected, with creeping of the motor vehicle being prevented by not initiating automatic activation of the drive machine or by activating a creep prevention measure, if, upon release of the brake pedal or in a released state of the brake pedal, an obstruction situated in the present direction of travel of the motor vehicle is detected.

2 Claims, 4 Drawing Sheets

(51) Int. Cl.
*B60K 28/10* (2006.01)
*B60W 10/11* (2012.01)
*B60W 10/184* (2012.01)
*B60W 30/09* (2012.01)
*B60W 30/18* (2012.01)
*F02N 11/08* (2006.01)

(52) U.S. Cl.
CPC .......... *B60W 10/184* (2013.01); *B60W 30/09* (2013.01); *B60W 30/18018* (2013.01); *B60W 30/18027* (2013.01); *B60W 30/18063* (2013.01); *B60W 30/18118* (2013.01); *F02N 11/0822* (2013.01); *B60W 2520/04* (2013.01); *B60W 2520/10* (2013.01); *B60W 2540/12* (2013.01); *B60W 2550/10* (2013.01); *F02N 2200/102* (2013.01); *Y02T 10/48* (2013.01); *Y10T 477/65* (2015.01); *Y10T 477/681* (2015.01); *Y10T 477/814* (2015.01); *Y10T 477/816* (2015.01); *Y10T 477/87* (2015.01)

(58) Field of Classification Search
CPC ............ Y10T 477/814; Y10T 477/816; B60W 2520/04; B60W 30/18063; B60W 10/184; B60W 30/09; B60W 30/18018; B60W 30/18027; B60W 10/06; B60W 2520/10; B60W 2540/12; B60W 2550/10; Y02T 10/48

See application file for complete search history.

(56) References Cited

U.S. PATENT DOCUMENTS

| | | | |
|---|---|---|---|
| 2007/0112494 A1* | 5/2007 | Naik | B60K 31/0008 |
| | | | 701/55 |
| 2011/0190095 A1 | 8/2011 | Bollig et al. | |
| 2011/0238284 A1 | 9/2011 | Bollig et al. | |
| 2015/0105999 A1* | 4/2015 | Sangameswaran | F02N 11/0837 |
| | | | 701/112 |
| 2016/0272205 A1* | 9/2016 | Kato | B60T 7/12 |
| 2016/0297415 A1* | 10/2016 | Kato | B60W 30/18118 |
| 2016/0297443 A1* | 10/2016 | Kato | B60T 7/122 |

FOREIGN PATENT DOCUMENTS

| | | |
|---|---|---|
| DE | 10 2008 006 028 A1 | 7/2009 |
| DE | 10 2008 061 790 A1 | 7/2010 |
| DE | 10 2008 061 791 A1 | 11/2010 |
| DE | 10 2009 052 253 A1 | 5/2011 |

\* cited by examiner

ADAPTIVE AUTOMATIC START-STOP SYSTEM FOR A MOTOR VEHICLE WITH AUTOMATIC GEARBOX, TAKING OBSTRUCTIONS INTO ACCOUNT

CROSS REFERENCE TO RELATED APPLICATIONS

This application claims priority under 35 U.S.C. § 119 from German Patent Application No. 10 2015 206 658.4, filed Apr. 14, 2015, the entire disclosure of which is herein expressly incorporated by reference.

BACKGROUND AND SUMMARY OF THE INVENTION

The invention relates to an automatic start-stop system for a motor vehicle with automatic gearbox or automated gearbox, for preventing an undesired creep movement.

At present, internal combustion engines are normally deactivated manually by the driver using an ignition key. One exception is a method presented in German patent document no. DE 100 23 331 A1. In that case, instead of the ignition key, the brake pedal position or brake pedal pressure is evaluated. The deactivation process of the internal combustion engine is initiated if, after the motor vehicle reaches a range close to standstill or comes to standstill, the brake pedal, in its already-actuated position, is actuated with greater intensity. For onward travel, the brake pedal is released and the accelerator pedal is depressed, after which starting of the internal combustion engine is initiated. A disadvantage of such methods is that the motor vehicle driver alone is responsible for the deactivation of the internal combustion engine. Analysis of modern driving behavior has shown that, despite increased environmental awareness and increased fuel prices, manual deactivation of the internal combustion engine, for example at traffic signals, is rarely performed independently.

To reduce fuel consumption and pollutant emissions, systems are already used in vehicles which automatically deactivate the internal combustion engine of a motor vehicle in the presence of certain prerequisites or in the presence of predefined deactivation conditions, and which automatically reactivate the internal combustion engine in the presence of predefined activation conditions. Such methods and systems or start-stop devices are suitable for the purposes of reducing fuel consumption in particular for urban traffic, because in urban traffic the vehicle often comes to a standstill at traffic signals or owing to the traffic situation, and the operation of the internal combustion engine is not necessary.

At present, different deactivation and activation logic regimes with different advantages are used by individual vehicle manufacturers. For example, vehicles with automatic gearboxes are available on the market in which the engine is automatically deactivated when the driver has braked the vehicle into the range close to standstill or to a standstill. The engine is restarted when the brake pedal is released or when a predefined brake pressure threshold is undershot during the release of the brake pedal. Another deactivation logic regime in the case of automatic vehicles provides for the engine to be deactivated only after approximately 1 second after coming to a standstill.

Furthermore, German patent document no. DE 10 2008 061 790 A1 has disclosed an automatic deactivation logic regime for automatic vehicles with a deceleration switch at standstill, wherein, furthermore, a holding function can be activated at the earliest when the standstill state is reached (that is to say a speed of zero is measured). German patent document no. DE 10 2008 061 791 A1 has presented a similar method, wherein a so-called auto-hold function is activated when the brake pedal is released in the vehicle standstill state, or when the vehicle standstill state is reached, or when an automatic deactivation process is performed.

Furthermore, German patent document no. DE 10 2008 006 028 A1 has disclosed a method and a device for the automatic activation and deactivation of an internal combustion engine, wherein surroundings data are detected and are evaluated for the identification of particular traffic situations in which relatively long standstill periods are likely. A switch in the operating state of the internal combustion engine (deactivation or starting) is effected in a manner dependent on the identified traffic situation. If, for example on the basis of the surroundings data, a stoppage phase of the motor vehicle behind a vehicle situated ahead is identified, then a traffic situation in which a deactivation of the internal combustion engine is expedient is detected with greater probability than in the case of merely the vehicle standstill state being identified. If, when the internal combustion engine is deactivated, an increase in the spacing is detected, an automatic start of the internal combustion engine is initiated. Here, it is the case in particular that the operating actions or demand of the driver do not play a role in the logic regime regarding when an automatic activation process is performed, because the decision is made exclusively on the basis of present surroundings information.

It is now an object of the invention to provide an automatic start-stop system for a motor vehicle with automatic gearbox, in which the basic deactivation and activation logic regime is based on operating actions of the driver, but at the same time possible collisions with objects situated in the direction of travel should be prevented.

The invention is based on the consideration of providing a deactivation and activation logic regime which provides an automatic deactivation and restarting of the drive machine on the basis of identifiable driver demands, because, with such a logic regime, the acceptance of such systems is at its greatest.

A corresponding deactivation logic regime provides, in the case of motor vehicles with automatic gearbox or automated gearbox, that is to say in the case of vehicles in which the drive architecture is constructed such that the vehicle can move slowly, that is to say creep, when the brake pedal is released (and the accelerator pedal is not actuated), that an automatic deactivation process of a drive machine of the motor vehicle is triggered if a brake pedal actuation is detected and the speed of the vehicle is close to zero or is zero, that is to say the vehicle is braked to a standstill by the driver. Aside from these prerequisites, there shall be no deactivation prevention conditions, such as for example an excessively low engine temperature or air-conditioning system demands, which require operation of the drive machine. An automatic activation process is basically triggered when a release of the brake pedal, i.e. an undershooting of a threshold value to a corresponding extent by a parameter which correlates with the release of the brake pedal, or a released state of the brake pedal, is detected. When the drive machine has been started and the brake pedal released, the vehicle is accelerated by way of the creep torque. This starting-off is basically acceptable because the driver, after releasing the brake, will generally subsequently apply the accelerator pedal in order to travel onward.

The onset of creeping could be a problem if the driver brakes in front of an obstruction (for example in front of the garage door or a parked vehicle) in order to park, and the engine is in this case automatically deactivated. If the engine is off and the driver intends to exit the vehicle, the driver initially releases the brake pedal. As a result of the release of the brake pedal, the engine starts again and the vehicle is set in motion, which in this situation is not expected by the driver. If the driver reacts too slowly, this onset of creeping could lead to a possible collision with the obstruction.

To be able to identify such situations which may lead to a possible collision with an object situated in the direction of travel, in particular owing to a generated creep torque, the invention furthermore provides for the start-stop device to additionally be designed to detect an obstruction situated in the present direction of travel of the motor vehicle and to take said information into account in the control of the vehicle.

To now be able to prevent a collision with the detected obstruction owing to a generated creep torque, it is provided according to a first aspect of the invention that the automatic start-stop system according to the invention is designed such that, to prevent creeping of the motor vehicle, an automatic activation of the drive machine upon release of the brake pedal (in particular in the case of the brake pedal being released by more than a predefined amount) or in a detected released state of the brake pedal is not triggered by said automatic start-stop system if, upon release of the brake pedal or in a released state of the brake pedal, an obstruction situated in the present direction of travel (in front in the case of forward travel, behind in the case of reverse travel) of the motor vehicle is detected.

A release of the brake pedal can be identified through evaluation of various signals or operating parameters, such as for example the brake pressure and/or the braking torque and/or the brake pedal position. Here, a release of the brake pedal may be identified when a reduction in the brake pressure and/or in the braking torque and/or in the brake pedal deflection is detected, or if a reduction in the brake pressure and/or in the braking torque and/or in the brake pedal deflection by more than a predefined minimum amount is detected, or if a defined (possibly variable) brake pressure and/or a defined (possibly variable) braking torque and/or a defined brake pedal deflection is undershot. Analogously, it is also possible for an actuation of the brake pedal to be determined, wherein here, instead of a reduction or undershooting, an increase or exceedance must be detected.

It is advantageously possible, for the detection of such obstructions, for use to be made of various sensors which can register the immediate surroundings of the vehicle in the direction of travel. In particular, for this purpose, it is possible, for example, for data from radar and/or lidar and/or camera and/or ultrasound sensors to be evaluated. By means of such sensors, it is for example possible for the spacing to an object situated in the direction of travel of the motor vehicle to be determined. The obstruction determination may either be active at all times or may be active at least when obstruction detection is necessary. An obstruction may also be considered to have been detected, upon release of the brake pedal or in a released state of the brake pedal, if the obstruction was detected already at the time of the automatic deactivation process of the drive machine. However, in order to be able to take into account a situation in which the previously detected obstruction has moved away during the stoppage phase, it is provided in a particularly advantageous refinement of the invention that the creep prevention measure is triggered when an obstruction is detected, or is regarded as being present, at least at the time at which the brake pedal is released or the brake pedal is in a released state.

It is advantageously the case that an obstruction situated in the direction of travel of the motor vehicle is detected if a determined spacing between the motor vehicle and the object situated in the direction of travel is smaller than a predefined spacing.

In order to additionally be able to prevent the vehicle beginning to roll, for example owing to the roadway inclination, upon release of the brake or in a released state of the brake, the start-stop device is additionally designed to trigger a containment of the brake pressure at a suitable level upon release of the brake pedal, in particular if, upon release of the brake pedal or in a released state of the brake pedal, an obstruction situated in the present direction of travel or counter to the present direction of travel is detected. The level of the contained brake pressure should in this case be at least high enough to prevent the vehicle from rolling away.

In order also to be able to make automatic restarting of the drive machine possible for the driver, it is necessary in such a situation, in which automatic starting of the drive machine upon release of the brake pedal is not permitted, to provide an alternative operating logic regime for the triggering of an automatic activation process of the automatically deactivated drive machine. The automatic start-stop system is advantageously designed to trigger an automatic activation process of the drive machine upon release of the brake pedal or in a released state of the brake pedal (at the earliest) if, in the case of an automatic activation process not having been triggered, an actuation of the accelerator pedal, which the driver will basically actuate only if he or she intends to start off, is detected. If the automatic start-stop system is additionally designed so as to contain a brake pressure upon release of the brake pedal or in a released state of the brake pedal, triggering of a release of this brake pressure advantageously occurs if an actuation of the accelerator pedal is detected or, at the latest, if the drive machine provides a drive torque which prevents the vehicle rolling (at least counter to the direction of travel).

It is self-evident that an automatic start is also triggered whenever a system-induced activation demand (for example an excessively low state of charge of the battery) exists.

Analogously to the automatic start-stop system according to the invention as per the first aspect of the invention, a second aspect of the invention is directed to a corresponding method for controlling a motor vehicle with automatic gearbox or automated gearbox, wherein an obstruction situated in the present direction of travel of the motor vehicle can be detected, and it is basically the case that an automatic deactivation process of the drive machine of the motor vehicle is triggered if at least a vehicle speed which is at least lower than a predefined speed threshold close to standstill, or which is zero, and a brake pedal actuation (of corresponding magnitude) are detected, and an automatic activation process of the automatically deactivated drive machine is triggered if a release of the brake pedal or a released state of the brake pedal is detected. However, if, upon release of the brake pedal or in a released state of the brake pedal, an obstruction situated in the present direction of travel of the motor vehicle is detected, an automatic activation of the drive machine is not triggered, or is prevented, for the purposes of preventing creeping of the motor vehicle.

As an alternative to the first embodiment of the automatic start-stop system according to the invention for collision prevention, it is possible, with basically identical deactivation and partially identical activation logic regimes and for the purposes of preventing a collision of the motor vehicle with a detected obstruction owing to a generated creep torque, for the automatic start-stop system according to the invention to be designed in accordance with a third aspect of the invention, which is coordinate with the first and second aspect of the invention, whereby, to prevent creeping of the motor vehicle, a creep prevention measure is triggered, with the drive machine activated, if, before or upon the release of the brake pedal or in a released state of the brake pedal, an automatic activation of the drive machine is triggered and an obstruction situated in the present direction of travel of the motor vehicle is detected. Here, although the drive machine is automatically started in accordance with the activation logic presented in the introduction, starting-off as a result of creeping of the vehicle is prevented by virtue of a creep prevention control measure being triggered.

The identification of an actuation of the brake pedal and/or of a release of the brake pedal, and the detection of an obstruction, may likewise be performed in accordance with the above statements.

Correspondingly to the first alternative, it is advantageously also the case here that an obstruction situated in the present direction of travel of the motor vehicle is detected if a determined spacing between the motor vehicle and an object situated in the direction of travel is smaller than a predefined threshold value.

As a creep prevention measure, it may for example be provided that, upon release of the brake pedal or in a released state of the brake pedal, a containment of a brake pressure at a suitable level is triggered. The level of said contained brake pressure should in this case be at least great enough that (commencement of) creeping of the vehicle is prevented. Alternatively, it is also possible for a so-called auto-hold function to be activated, whereby commencement of creeping of the vehicle is prevented.

As a further alternative, it is (additionally) possible, as a creep prevention measure, for an interruption in power transmission between the drive machine and the drive wheels to also be triggered. This would be possible for example by way of temporary shifting into the neutral gearbox position.

Analogously to the embodiment as per the first alternative, it is possible, in such an embodiment of the automatic start-stop system, in which a creep prevention measure is triggered in order to prevent a collision, for the triggered creep prevention measure to be cancelled if an actuation of the accelerator pedal is detected, because in the event of an actuation of the accelerator pedal, it can be assumed that it is the driver's intention for the vehicle to start off.

Analogously to said second automatic start-stop system according to the invention, a further aspect of the invention is directed to a corresponding method for controlling a motor vehicle with automatic gearbox or automated gearbox, wherein—as has already been disclosed above—an obstruction situated in the present direction of travel of the motor vehicle can be detected, and it is basically the case that an automatic deactivation process of the drive machine of the motor vehicle is triggered if at least a vehicle speed which is at least lower than a predefined speed threshold close to standstill, or which is zero, and a brake pedal actuation are detected, and an automatic activation process of the automatically deactivated drive machine is triggered if a release of the brake pedal or a released state of the brake pedal is detected. If, upon release of the brake pedal or in a released state of the brake pedal, an obstruction situated in the present direction of travel of the motor vehicle is detected, an automatic activation process of the drive machine is duly triggered but, in order to prevent creeping of the motor vehicle, a creep prevention measure is triggered with the drive machine activated.

The above statements regarding the two automatic start-stop systems according to the invention correspondingly also apply to the method according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
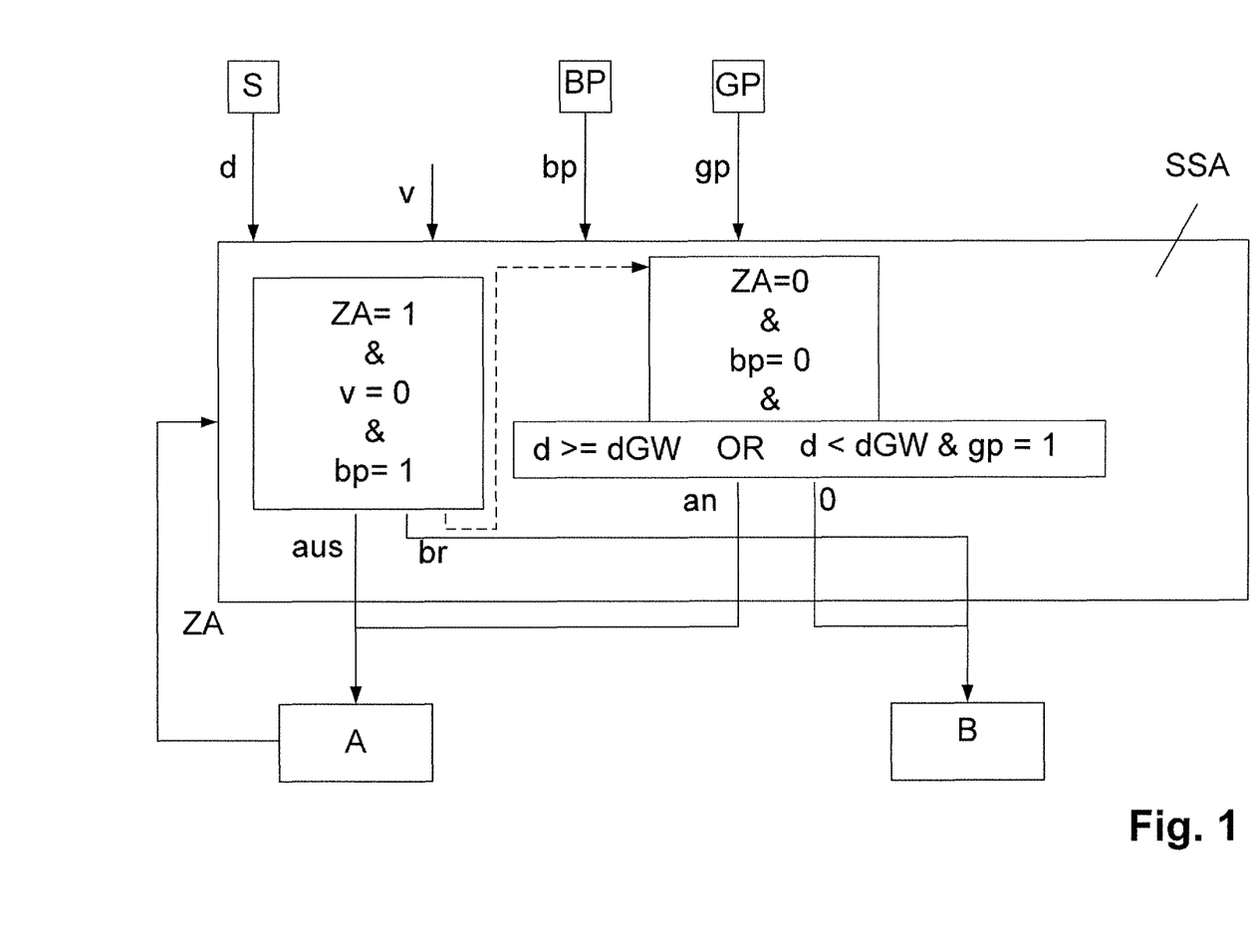
FIG. 1 shows a first embodiment of an automatic start-stop system in accordance with the present invention.

FIG. 1 shows, as a central element, an automatic start-stop system SSA which receives various input signals d, v, bp, gp and ZA and which outputs activation signals aus, an, 0 and br. In detail, the automatic start-stop system SSA receives signals d from a sensor arrangement S which is arranged on the vehicle and which is oriented substantially toward the front and toward the rear, said signals d indicating the spacing d of the motor vehicle to an obstruction situated in the present direction of travel (in front or behind or on the right-hand side or on the left-hand side). The sensor arrangement S may comprise sensor elements of different design, such as for example radar sensors and/or camera sensors and/or lidar sensors and/or ultrasound sensors, wherein the data provided by the sensor elements are evaluated in an evaluation unit (not illustrated in any more detail here) for determining the respective spacing d.

Furthermore, the automatic start-stop system SSA receives a speed signal v of the motor vehicle, a signal by which provides information regarding the present state of actuation of the brake pedal BP (bp=1 when the brake pedal is actuated, and bp=0 when the brake pedal is not actuated), and a signal gp, which provides information regarding the present state of actuation of the accelerator pedal GP (gp=1 when the accelerator pedal is actuated, and gp=0 when the accelerator pedal is not actuated).

Finally, the automatic start-stop system SSA receives a signal ZA which provides information regarding the present state of the drive machine A (ZA=1 when the drive machine is in operation, and ZA=0 when the drive machine is in the automatically deactivated state). The drive machine may be any type of drive machine, though the automatic start-stop system SSA is preferably suitable for internal combustion engines.

The automatic start-stop system SSA is now constructed such that, when the engine is running, that is to say when ZA=1, said automatic start-stop system continuously evaluates the speed v of the vehicle and the position of the brake pedal BP with regard to whether the speed v of the vehicle is at least approximately zero, or a standstill state is identified, and the brake pedal BP is actuated, that is to say the signal bp=1. If all of these conditions are satisfied, and if there are also no (system-induced) deactivation prevention conditions (for example an excessively steep gradient, an excessively low state of charge of the battery) present, the automatic start-stop system SSA transmits a signal "aus" to the drive machine A, whereby an automatic deactivation process of the drive machine A is triggered. Furthermore, the automatic start-stop system SSA transmits a signal br to the brake actuator arrangement B for the purposes of containing the brake pressure at a suitable level, such that the vehicle is prevented from rolling away upon a (subsequent) release of the brake pedal.

Furthermore, the automatic start-stop system SSA comprises an evaluation unit which, in the event of the drive machine A having been automatically deactivated (ZA=0) and in the presence of an activation demand, triggers an automatic start of the drive machine A. In detail, the automatic start-stop system SSA performs monitoring of the state of the drive machine A, of the position of the brake pedal BP and of the determined spacing d to an obstruction situated in the present direction of travel. If, in the case of the drive machine A having been automatically deactivated (ZA=0), the brake pedal BP is released (bp=0), and if the determined spacing d to an obstruction situated in the present direction of travel is greater than a predefined spacing threshold value dGW, the automatic start-stop system SSA transmits a signal "an" to the drive machine A, whereby an automatic start of the drive machine A is triggered. At the same time, the automatic start-stop system SSA triggers a withdrawal of the contained brake pressure by outputting a signal "0" to the brake actuator arrangement B. Not illustrated here, but mentioned for the sake of completeness, is the fact that, for safety reasons, the contained brake pressure is withdrawn only when the drive machine A is capable of providing a drive torque which prevents the vehicle from rolling at least counter to the direction of travel.

If the determined spacing d is smaller than the predefined spacing threshold value dGW, an automatic start of the drive machine A is triggered not immediately but only when an actuation of the accelerator pedal GP is detected, that is to say the signal gp has the value "1".

Figure 2:
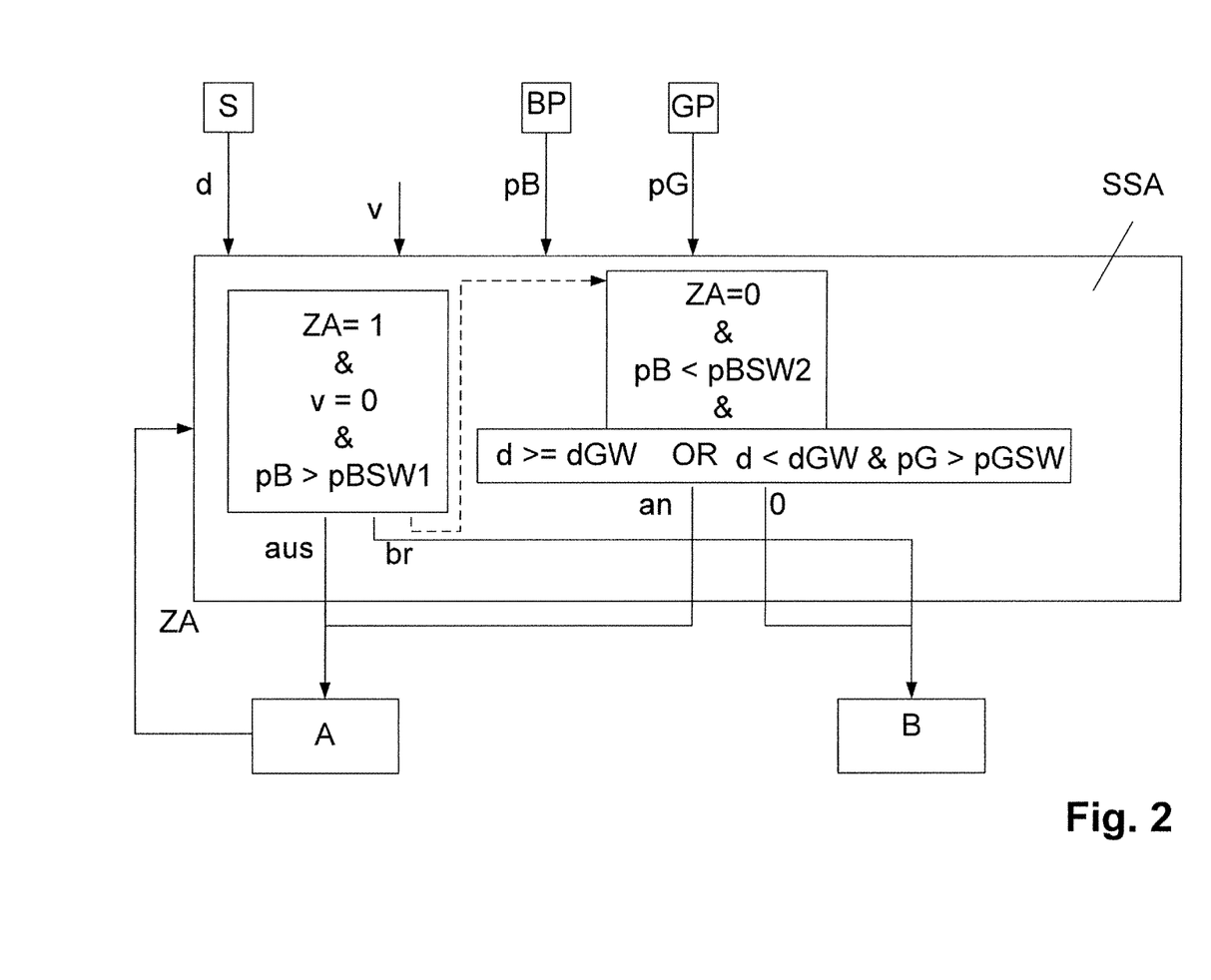
FIG. 2 shows a second embodiment of an automatic start-stop system in accordance with the present invention.

FIG. 2 shows an alternative embodiment of an automatic start-stop system SSA in relation to the first embodiment, wherein the basic construction is identical to the first embodiment. Said second embodiment of a possible automatic start-stop system SSA differs merely in the type of signal pB received from the brake pedal BP, and in the type of signal pG received from the accelerator pedal GP, and the evaluation thereof.

From the brake pedal BP or from the brake system, the automatic start-stop system SSA receives information regarding the present brake pressure pB or that demanded on the basis of the brake pedal actuation, and a signal pG which provides information regarding the present deflection of the accelerator pedal GP.

The automatic start-stop system SSA is now constructed such that, when the engine is running, that is to say when ZA=1, said automatic start-stop system continuously evaluates the speed v of the vehicle and the brake pressure pB of the brake system BS with regard to whether the speed v of the vehicle is at least approximately zero, or a standstill state is identified, and the brake pedal BP is actuated, that is to say the brake pressure pB triggered by the brake pedal is greater than zero, in particular is greater than a predefined first brake pressure threshold pBSW1. If all of these conditions are satisfied, and if there are also no (system-induced) deactivation prevention conditions present, the automatic start-stop system SSA transmits a signal "aus" to the drive machine A, whereby an automatic deactivation process of the drive machine A is triggered. Furthermore, the automatic start-stop system SSA transmits a signal br to the brake actuator arrangement B for the purposes of containing the brake pressure at a suitable level, such that the vehicle is prevented from rolling away upon a (subsequent) release of the brake pedal BP.

Furthermore, the automatic start-stop system SSA comprises an evaluation unit which, in the event of the drive machine A having been automatically deactivated (ZA=0) and in the presence of an activation demand, triggers an automatic start of the drive machine A. In detail, the automatic start-stop system SSA performs monitoring of the state of the drive machine A, of the brake pressure pB demanded by way of actuation of the brake pedal, and of the determined spacing d to an obstruction situated in the present direction of travel. If, in the case of the drive machine A having been automatically deactivated (ZA=0), the brake pedal BP is released, that is to say if a reduction of the brake pressure pB demanded by the brake pedal to below a predefined second brake pressure threshold pBSW2 (which may be greater than or equal to the first brake pressure threshold pBSW1) is identified, and if the determined spacing d to an obstruction situated in the present direction of travel is greater than a predefined spacing threshold value dGW, the automatic start-stop system SSA transmits a signal "an" to the drive machine A, whereby an automatic start of the drive machine A is triggered. At the same time, the automatic start-stop system SSA triggers a withdrawal of the contained brake pressure by outputting a signal "0" to the brake actuator arrangement B. Not illustrated here, but mentioned for the sake of completeness, is the fact that, for safety reasons, the contained brake pressure is withdrawn only when the drive machine A is capable of providing a drive torque which prevents the vehicle from rolling at least counter to the direction of travel.

If the determined spacing d is smaller than the predefined spacing threshold value dGW, an automatic start of the drive machine A is triggered not immediately but only when an actuation pG of the accelerator pedal GP is detected which exceeds a predefined actuation threshold value pGSW.

Instead of the brake pressure pB demanded by way of the actuation of the brake pedal BP, it is analogously also possible, for example, for the deflection of the brake pedal BP, or the actuation force exerted on the brake pedal BP, to be evaluated.

Figure 3:
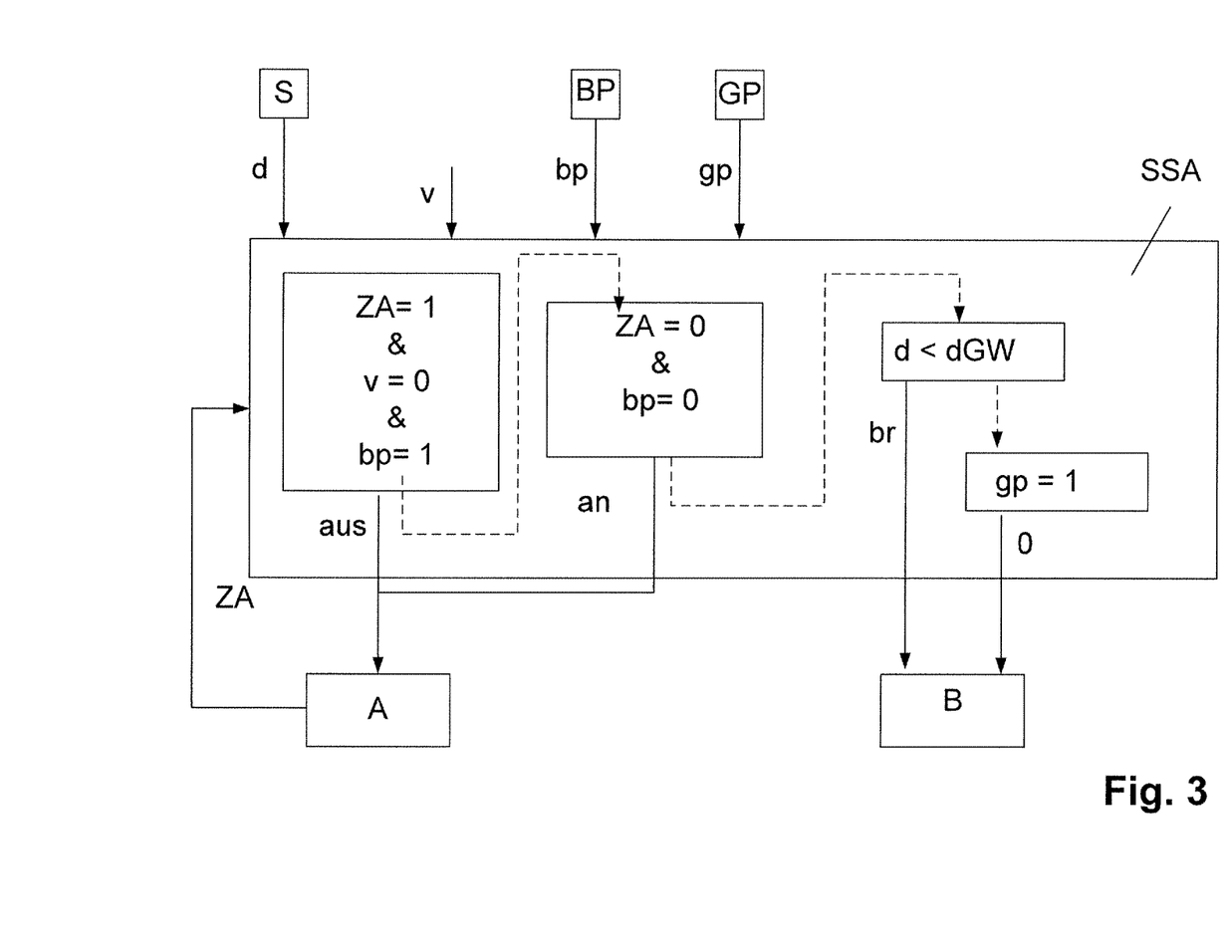
FIG. 3 shows a third embodiment of an automatic start-stop system in accordance with the present invention.

FIG. 3 now shows an alternative embodiment of an automatic start-stop system SSA for preventing a collision with an obstruction situated in the present direction of travel owing to a generated creep torque.

Analogously to FIG. 1, FIG. 3 shows, as a central element, an automatic start-stop system SSA which receives various input signals d, v, bp, gp and ZA and which outputs activation signals aus, an, 0 and br. With regard to further details on the input signals mentioned above, reference is made to the description relating to FIG. 1.

The automatic start-stop system SSA is now constructed such that, when the engine is running, that is to say when ZA=1, said automatic start-stop system continuously evaluates the speed v of the vehicle and the position of the brake pedal BP with regard to whether the speed v of the vehicle is at least approximately zero, or is zero, and the brake pedal BP is actuated, that is to say the signal bp=1. If all of these conditions are satisfied, and if there are also no (system-induced) deactivation prevention conditions (for example an excessively steep gradient, an excessively low state of charge of the battery) present, the automatic start-stop system SSA transmits a signal "aus" to the drive machine A, whereby an automatic deactivation process of the drive machine A is triggered.

Furthermore, the automatic start-stop system SSA comprises an evaluation unit which, in the event of the drive machine A having been automatically deactivated (ZA=0) and in the presence of an activation demand, triggers an automatic start of the drive machine A. In detail, the automatic start-stop system firstly performs monitoring of the state ZA of the drive machine A, and of the position of the brake pedal bp. If, in the case of the drive machine having been automatically deactivated (ZA=0), a release of the brake pedal BP is detected, that is to say the signal by assumes the value "zero", the automatic start-stop system SSA transmits a signal "an" to the drive machine A, whereby an automatic start of the drive machine A is triggered. Subsequently (or at least approximately at the same time, or even earlier, or permanently), the automatic start-stop system SSA evaluates the detected spacing d of the vehicle to an obstruction d situated in the present direction of travel, with regard to whether the determined spacing d is smaller than a predefined spacing threshold value dGW. If this is the case, the automatic start-stop system SSA triggers a creep prevention measure by outputting a signal br to the brake actuator arrangement B, whereby a brake pressure is triggered or contained, said brake pressure being of such a magnitude that (commencement of) creeping of the vehicle is prevented, that is to say the vehicle is held at a standstill despite the drive machine being activated and the brake pedal being released.

After initiation of the creep prevention measure, the automatic start-stop system SSA monitors the position of the accelerator pedal GP. If an actuation of the accelerator pedal GP is detected, that is to say if the signal gp assumes the value "1", the automatic start-stop system SSA triggers a withdrawal of the contained brake pressure by outputting a signal "0" to the brake actuator arrangement B.

Figure 4:
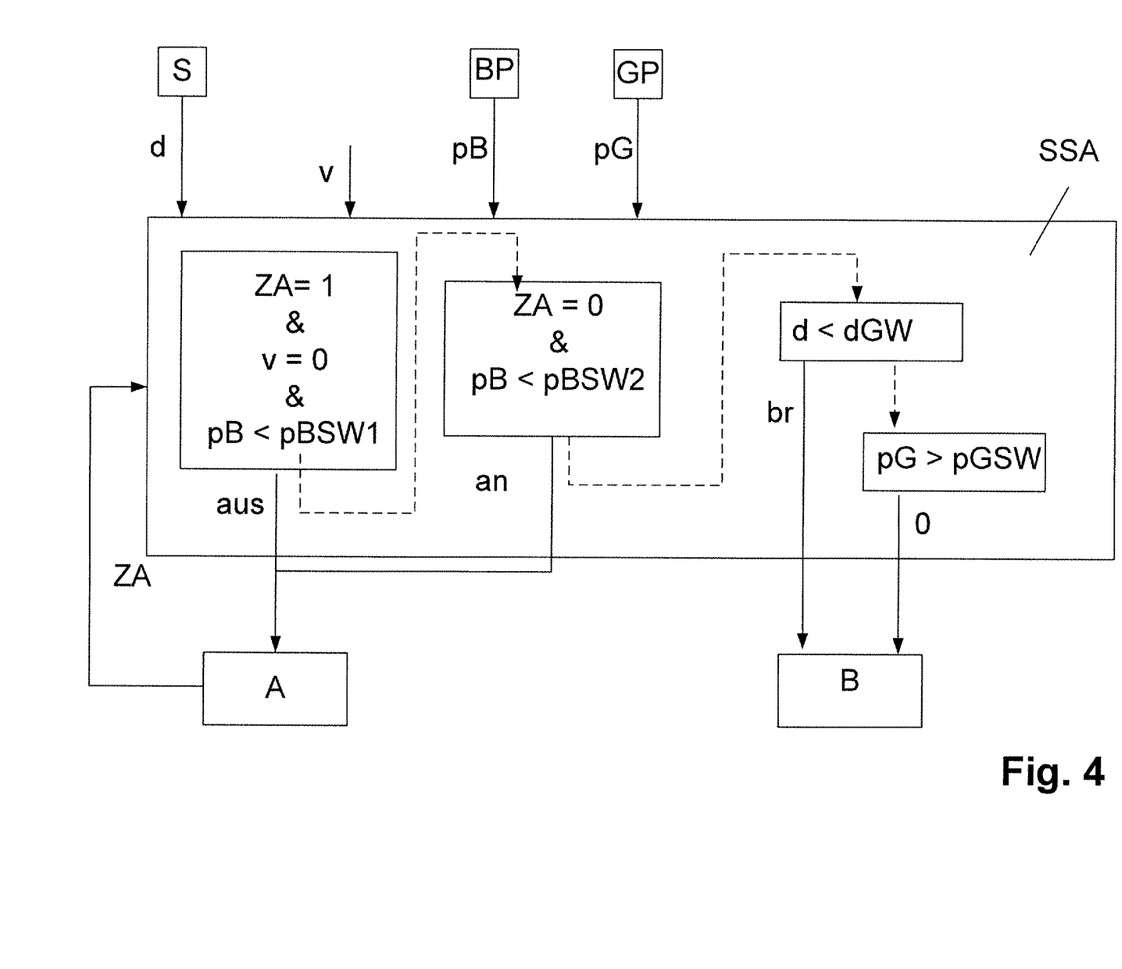
FIG. 4 shows a fourth embodiment of an automatic start-stop system in accordance with the present invention.

The embodiment of the automatic start-stop system SSA illustrated in FIG. 4 basically corresponds to the construction of the embodiment illustrated in FIG. 3, wherein here, analogously to FIG. 2, it is not the mere actuation or non-actuation of the brake pedal BP but rather the brake pressure pB demanded by the brake pedal BP that is detected and evaluated. Likewise, it is not the mere actuation or non-actuation of the accelerator pedal GP but the intensity of the actuation of the accelerator pedal pG that is received and evaluated.

Thus, an automatic deactivation process is triggered if, in addition to the other pre-requisites, the brake pressure pB demanded by the brake pedal BP undershoots a predefined first brake pressure threshold pBSW1. Automatic starting of the drive machine A is performed if, owing to the release of the brake pedal BP, the brake pressure pB demanded owing to the actuation of the brake pedal BP overshoots a predefined second brake pressure threshold pBSW2. If a creep prevention measure has been triggered (see the description relating to FIG. 3), the automatic start-stop system SSA monitors the deflection of the accelerator pedal GP. If an actuation pG of the accelerator pedal GP is detected which exceeds a predefined actuation threshold value pGSW, the automatic start-stop system SSA triggers a withdrawal of the contained brake pressure by outputting a signal "0" to the brake actuator arrangement B.

Instead of the demanded brake pressure, it is for example also possible for the deflection of the brake pedal, or the actuation force exerted on the brake pedal, to be monitored and evaluated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An automatic start-stop system for a vehicle equipped with an automatic gearbox or and automated gearbox capable of generating vehicle creep in a released state of a brake pedal, the automatic start-stop system comprising:
   a drive machine of the vehicle;
   an obstruction detector configured to detect an obstruction in a present direction of travel of the vehicle; and
   an evaluation unit, the evaluation unit being configured to
      initiate an automatic deactivation process of the drive machine of the vehicle if a vehicle speed is lower than a predefined speed threshold and a brake pedal of the vehicle is actuated, and
      initiate an automatic activation process of the automatically deactivated drive machine upon release of the brake pedal or detection of a released state of the brake pedal,
   wherein the automatic activation of the drive machine upon release of the brake pedal or detection of the released state of the brake pedal is not initiated if the obstruction detector detects the obstruction,
      the obstruction in the present direction of travel of the vehicle is detected if a spacing between the vehicle and the obstruction detected by the obstruction detector is smaller than a predefined threshold distance value,
      the obstruction detector is configured to detect an obstruction in a direction counter to the present direction of travel of the vehicle,
      the evaluation unit is configured to execute executing a containment of a brake pressure in a brake system of the vehicle upon release of the brake pedal or when in a released state of the brake pedal when at least one of the obstruction situated in the present direction of travel and the obstruction in the direction counter to the present direction of travel of the vehicle is detected,
      the automatic activation process of the drive machine is initiated upon release of the brake pedal or in the released state of the brake pedal when an actuation of an accelerator pedal is detected, and
      the evaluation unit is configured to release the brake pressure upon at least one of the actuation of the accelerator pedal and application of a drive torque provided to prevent a movement of the vehicle counter to the present direction of travel.

2. The automatic start-stop system as claimed in claim 1, wherein
   the evaluation unit is configured to execute a containment of a brake pressure in a brake system of the vehicle upon release of the brake pedal or when in a released state of the brake pedal when the obstruction situated in the present direction of travel is detected.

* * * * *